United States Patent Office 2,980,473
Patented Apr. 18, 1961

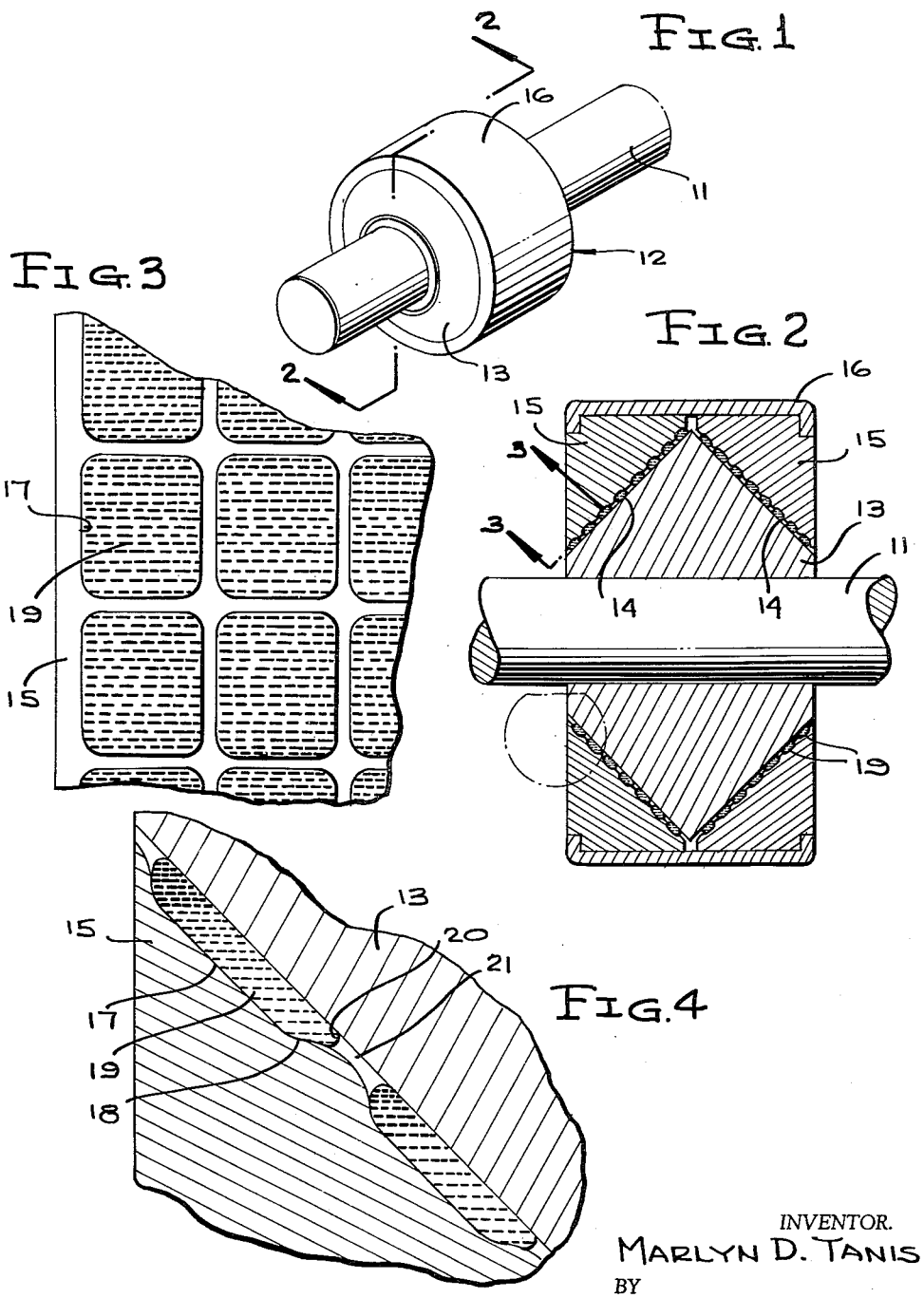

2,980,473

SURFACE TENSION BEARING

Marlyn D. Tanis, 6318 Dorchester Road, Lockport, N.Y.

Filed Oct. 17, 1958, Ser. No. 767,914

5 Claims. (Cl. 308—161)

This invention relates to bearings, and more particularly to a bearing structure which employs the surface tension of a liquid material as the load-resisting means between the components of the bearing assembly.

A main object of the invention is to provide a novel and improved bearing which is simple in construction, which is resistant to wear, and which provides a highly efficient anti-friction action.

A further object of the invention is to provide an improved bearing which is superior to those in conventional use, the bearing being adapted to support its load even at low bearing speeds, being low in cost, and providing much lower friction losses than are obtained from conventional bearings.

Further objects and advantages of the invention will become apparent from the following description and claims, and from the accompanying drawings, wherein:

Figure 1 is a perspective view of a shaft element provided with an improved bearing constructed in accordance with the present invention.

Figure 2 is an enlarged cross sectional view taken on the line 2—2 of Figure 1.

Figure 3 is an enlarged cross sectional detail view taken on the line 3—3 of Figure 2.

Figure 4 is a fragmentary cross sectional view showing the opposing bearing surfaces of Figure 2, but drawn to a much larger scale, and illustrating the manner in which the bearing liquid deforms to define edge portions of relatively small radius of curvature responsive to loading between the bearing members.

Referring to the drawings, 11 designates a shaft section and 12 generally designates a typical bearing assembly constructed in accordance with the present invention.

The bearing assembly comprises an inner member 13 which is secured on the shaft section 11 so as to be rigid therewith, the inner member 13 being shaped, for example, to define a pair of oppositely tapering conical surfaces 14, 14 symmetrically arranged with respect to a transverse plane extending perpendicular to the axis of the shaft section 11. A pair of annular outer bearing elements 15, 15 are disposed adjacent the conical surfaces 14, 14, said outer bearing members 15 being secured in an annular retaining shell 16 and being retained by respective inwardly directed peripheral flanges provided on said shell 16.

As shown in Figure 4, the outer bearing members 15 are formed with relatively shallow recesses of any suitable shape, for example, of rectangular shape, shown at 17, said recesses being distributed over the entire area of the members 15 facing the mating conical surface portions 14. The recesses 17 taper in depth toward their margins, as shown at 18. Disposed in each recess is a mass of non-wetting liquid 19, for example, a mass of mercury, or any other liquid which does not wet the bearing surfaces. Thus, each mass of liquid 19 acts as a yieldable support between the members 13 and 15 and deforms in response to loading on the bearing. Under such loading conditions, the marginal edge portions of each mass of non-wetting liquid tend to flatten out and to reduce their radii of curvature, for example, the marginal edge portions 20 of the mass of liquid 19 reduce their radii of curvature as the mass of liquid is squeezed between the bearing members 13 and 15. The squeezing force exerted on the masses of non-wetting liquid 19 decreases their radii of curvature, whereby the internal pressures increase to resist the increased loading on the bearing.

The recesses 17 may be of any size or shape, but are formed so as to effectively retain their associated liquid masses 19 therein, the clearance spaces 21 between the recesses being sufficiently narrow so that the liquid masses cannot shift from the recesses.

As is well known, the action of surface tension will cause a bead of mercury or similar (non-wetting) material to resist being deformed from its normal spherical shape by surfaces it does not wet. The bearing of the present invention uses this resisting force to support the load applied to the bearing.

In the assembly illustrated, one bearing surface, namely, the surface 14, is smooth, this being the surface secured to the shaft 11 and moving with said shaft. As above mentioned, increased force applied to the liquid masses 19 tends to flatten said masses and to reduce the radii of curvature at the edges 20 thereof, increasing the internal pressure of the liquid and thus increasing the resisting force.

Obviously, the bearing surfaces may be of any shape, and may be arranged as thrust or journal bearings, or in order to meet the requirements of any particular situation.

Under ordinary conditions, the non-wetting liquid may be mercury, since mercury has good surface tension characteristics. However, other liquids having good surface tension characteristics may be employed in place of mercury. Liquid zinc and copper, for example, have a much higher surface tension than mercury and bearings constructed employing these metals would be extremely advantageous under conditions of high temperature operation.

While a specific embodiment of an improved surface tension bearing assembly has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a bearing of the character described, a first surface a second surface disposed adjacent to and being spaced from or only lightly touching said first surface and being movable relative thereto, at least one of said surfaces being formed with relatively shallow, non-communicating recesses, said surfaces being non-wetting with respect to mercury, and respective discreet liquid mercury masses in said recesses and being of sufficient size to engage the opposing surface and to support same by surface tension.

2. In a bearing of the character described, a first surface, a second surface disposed adjacent to and being spaced from or only lightly touching said first surface and being movable relative thereto, at least one of said surfaces being formed with relatively shallow, non-communicating recesses, said surfaces being non-wetting with respect to mercury, and respective discrete liquid mercury masses in said recesses and being of sufficient size to engage the opposing surface and to support same by surface tension, said recesses tapering in depth toward their margins, whereby loading on the bearing deforms the liquid masses so that the radii of curvature of the edge portions of the liquid masses are reduced.

3. In a bearing of the character described, a first surface, a second surface disposed adjacent to and being spaced from or only lightly touching said first surface and being rotatable relative thereto, at least one of said surfaces being formed with relatively shallow, non-communicating recesses facing the other surface, said surfaces being non-wetting with respect to mercury, and respective discrete liquid mercury masses in said recesses and being of sufficient size to engage said other surface and to support same by surface tension, said recesses tapering in depth toward their margins, whereby loading on the bearing deforms the liquid masses so that the radii of curavture of the edges of the liquid masses are reduced.

4. In a bearing of the character described, a first surface, a second surface disposed adjacent to and being spaced from or only lightly touching said first surface and being rotatable relative thereto, at least one of said surfaces being formed with relatively shallow, non-communicating recesses facing the other surface and distributed over a substantial portion of its area, said surfaces being non-wetting with respect to mercury, and respective discrete liquid mercury masses in said recesses and being of sufficient size to engage said other surface and to support same by surface tension, said recesses tapering in depth toward their margins, whereby loading on the bearing deforms the liquid mercury masses so that the radii of curvature of their edges are reduced.

5. In a bearing assembly, a shaft, an inner bearing member secured to said shaft, said inner bearing member being formed with opposing convex conical surfaces, respective outer members surrounding said conical surfaces, said outer members being formed with generally concave surfaces facing and closely adjacent said first-named conical surfaces, a retaining ring secured on said outer members and being provided with inwardly directed peripheral retaining flanges engaging said outer members and preventing displacement of said outer members away from said inner bearing member, the conical concave surfaces being formed with relatively shallow non-communicating recesses tapering in depth toward their margins, said surfaces being non-wetting with respect to mercury, and respective discrete liquid mercury masses in said recesses and being of sufficient size to engage said first-named conical surfaces and to support same by surface tension.

References Cited in the file of this patent
UNITED STATES PATENTS

| | | |
|---|---|---|
| 1,544,488 | Sherwood | June 30, 1925 |
| 1,598,321 | Sherwood | Aug. 31, 1926 |
| 2,049,343 | Warren | July 28, 1936 |
| 2,108,641 | Blodgett | Feb. 15, 1938 |
| 2,611,665 | Derbyshire | Sept. 23, 1952 |
| 2,631,905 | Coppen | Mar. 17, 1953 |